United States Patent [19]

Tanaka et al.

[11] 4,100,389
[45] Jul. 11, 1978

[54] METHOD OF HIGH SPEED GAS SHIELDED ARC WELDING

[75] Inventors: Jinkichi Tanaka; Itaru Watanabe; Motoaki Suzuki, all of Yokohama, Japan

[73] Assignee: Nippon Kokan Kabushiki Kaisha, Tokyo, Japan

[21] Appl. No.: 751,984

[22] Filed: Dec. 20, 1976

[30] Foreign Application Priority Data

Dec. 24, 1975 [JP] Japan .................................. 50-153463

[51] Int. Cl.² .............................................. B23K 9/02
[52] U.S. Cl. ..................................... 219/74; 219/59.1; 219/137 R
[58] Field of Search ................ 219/137 R, 74, 59, 59.1

[56] References Cited

U.S. PATENT DOCUMENTS

| | | | |
|---|---|---|---|
| 3,149,220 | 9/1964 | Soulary et al. | 219/74 |
| 3,496,323 | 2/1970 | Lesnewich et al. | 219/74 |
| 3,732,393 | 5/1973 | Wilkens et al. | 219/137 R |
| 4,034,179 | 7/1977 | Koshiga et al. | 219/74 |

*Primary Examiner*—J. V. Truhe
*Assistant Examiner*—Clifford C. Shaw
*Attorney, Agent, or Firm*—Flynn & Frishauf

[57] ABSTRACT

In a gas shielded arc welding method for a long seam of formed pipe and the like, an improved method of setting up a welding voltage-current such that incomplete short circuiting transfer is performed with a high speed of more than at least 3m/min. and particularly, 5m/min. or more, without requiring stopping of the arc at short circuiting intervals.

11 Claims, 11 Drawing Figures

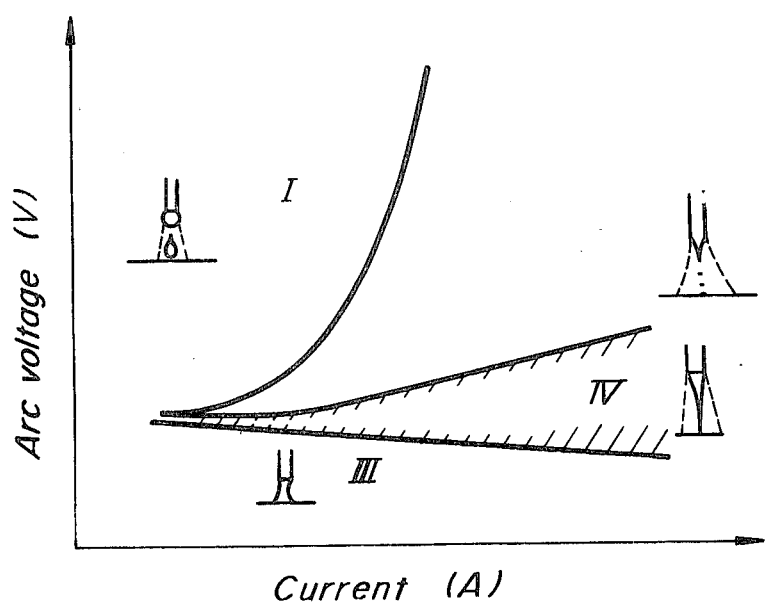
FIG_1

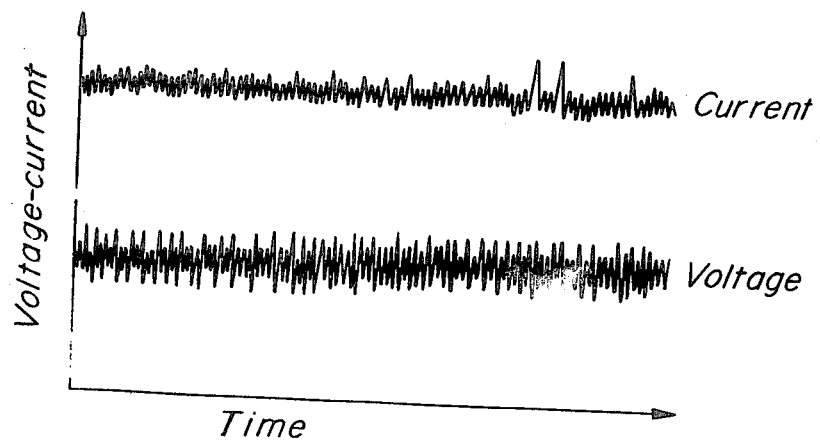
FIG_3
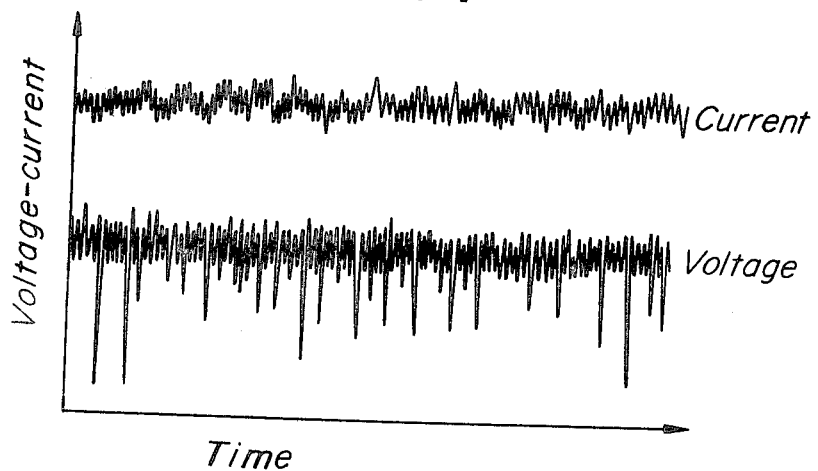
FIG_4
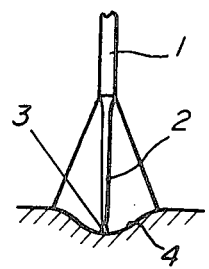
FIG_5

METHOD OF HIGH SPEED GAS SHIELDED ARC WELDING

This invention relates to an improved method of high speed gas shielded arc welding, and more particularly, to a method of forming an continuous sound bead covering an overall length of a long seam.

In making a large diameter welding pipe by the "UOE" process, a tack weld for the seam formed by an "O" press, is usually manually carried out by a welding operation such as spot welding. Such a tack weld has disadvantages in that the work is troublesome and the welding efficiency is low, consequently, increasing cost. Therefore, the forming of discontinuous tack weld beads by arranging many movable gas shielded arc welding torches at a suitable interval, e.g. 30cm, has been put into practice. However, this welding method performed in the direction of the length of a formed pipe brought about an uneven groove face in a regular welding process following the above tack weld. Consequently, the formed beads become wavy and the bead width is not uniform, and then, the external appearance becomes worse. There are, furthermore, unequal depth of penetration and produced lack of fusion. For avoiding such a lack of fusion, the increasing of the above tack weld current may be attempted. However, method requires a special operator for increasing the welding current at an interval of the tack weld beads. Accordingly, it is usual to predetermine tack weld current at a high level. In such a case, the welding heat input becomes excessively elevated, consequently, the formed beads become irregular so that the depth of penetration reaches about 80% of thickness of the material, and deterioration of quality is brought about.

From the above-mentioned point of view, a gas shielded arc welding method covering an overall length of the seam without an intermittent weld is required. In this case, the increasing of the welding speed may be an indispensable requirement for giving satisfactory results to a continuous tack weld covering an overall length of the seam. But, the mere increasing of the above weld speed tends to produce a lack of fusion, some undercut or humping beads forming like a rosary, owing to which the welded metals become hard to be a large mass at a high welding speed. For such a reason, the welding speed of 1m/min is an upper limit using prior art techniques. The following prior art techniques have been proposed as improvements for the above method.

First, a welding voltage-current in a $CO_2$ gas arc welding process is set up within the scope where a droplet is shifted according to the short circuit transfer. Next, in the same $CO_2$ gas arc welding process, the welding voltage is set up at a level of about plus 2V of a voltage V that the arc will begin to short-circuit and the current is set up in the scope of more than 400A. According to such a system, it is reported that sound tack weld beads may be formed at a welding speed of 4.5m/min or 4.2m/min. In each of these instances, the following difficulties arise under a welding speed of more than the above level, e.g. 5m/min or more. That is to say:

The former method; some spatters stick to the surface of the formed beads and the transfering of droplets tends to be uncertain; consequently, the beads may be discontinuous. The latter method: an abnormal bead such as a humping bead tends to be formed.

As mentioned above, it are very difficult that sound beads having no defect is formed under such a high welding speed as 5m/min or more. An improved gas shielded arc welding method for forming sound and continuous beads under a high welding speed of more than 5m/min is not yet proposed.

SUMMARY OF THE INVENTION

This invention has been developed to resolve the above present state of continuous tack welding covering the overall seam of formed pipe and the like. The features of this invention lie in that a welding voltage-current is set up to perform incomplete short circuiting transfer at a higher speed than ever before without stopping of the arc at short circuiting intervals.

An object of this invention is to provide an improved gas shielded arc welding method of forming continuous sound beads covering the overall seam of formed pipe and the like.

Another object of this invention is to provide an improved gas shielded arc welding method of forming sound beads at a higher speed than ever without occurrence of discontinuous beads and of abnormal bead.

BRIEF DESCRIPTION OF THE DRAWINGS

FIG. 1 shows a typical droplet transfer method dependent on a welding voltage-current.

FIG. 2 is an oscillogram showing the short circuiting transfer technique of the prior art in FIG. 1.

FIG. 3 is an oscillogram showing the spray transfer technique of the prior art in FIG. 1.

FIG. 4 is an oscillogram showing incomplete short circuiting transfer based on the method of the present invention in FIG. 1.

FIG. 5 is an explanatory view showing a typical practice of the short circuiting transfer method in FIG. 4.

DETAILED DESCRIPTION

Figure 6A:
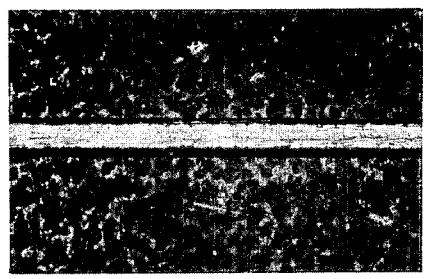
FIG. 6 (a) and FIG. 6 (b) are photographs showing a plane and a section of bead formed by the method of the present invention respectively.

This invention is based on new knowledge that sound continuous beads covering the overall seam of a formed pipe and the like are obtained by setting up a gas shielded arc welding voltage-current in a scope wherein incomplete short circuiting transfer is performed at a higher speed than ever before without a stopping of the arc at short circuiting intervals. The present invention enables high welding speeds of more than at least 3m/min, and particularly 5m/min or more.

It is, generally well known that increasing amount of deposited metal per unit of length and using large currents of more than 600A at high speed transfer of the arc together with increasing of the welding speed are the indispensable requirements for improving efficiency of gas shielded arc welding by a consumable electrode. Studying the manner of transfer of a droplet from the electrode corresponding to a change of weld current-voltage, there is found a pattern as shown in FIG. 1.

Sketch I in FIG. 1 shows globular transfer in low current-high voltage practice. As the voltage is lowered the manner of transfer of the droplet changes to that shown in sketch II (spray transfer - see FIG. 3) and then to that shown in sketch III short circuit transfer see FIG. 2, which is a typical transfer manner.

One of the disadvantages of the two above described prior art is that a sound weld bond is difficult to be obtained in either case. The reasons are as follows:

The short circuit transfer method: The arc is stopped at a time of short circuit. In this case, the arc stop time becomes longer as the voltage drops toward OV, and the current is increased at the above time of short circuit. Such a stop of the arc at the time of short circuit causes shortening of the heating time and a delay in the progress of the molten pool, bringing about direct contact of the droplet on a cold surface of the formed pipe. It will, consequently, be unavoidable that the number of short circuits decreases as the short circuit time increases, while the heating time therefor is drawn out. Consequently, while the molten amount per unit time of the short circuit increases, the transfer manner of the droplet tends to be unstable and some kind of discontinuity between the above-mentioned spatterings and the beads is brought about.

The spray transfer method: The welding voltage-current in actual operation is nearly constant as shown in the oscillogram in FIG. 3, stabilizing the arc. In this case, a column of arc showing an action of accelerating a plasma jet is always produced. Therefore, when the weld current is increased to stabilize the arc in order to raise the welding speed, the arc self-contracts and becomes some kind of hard arc. Consequently, the plasma jet generated by the difference of electromagnetic force between the electrode and the seam becomes remarkably strong and is more accelerated. While such a plasma jet blows off the molten metal backward, no molten metal exists just under the arc and the seam is directly exposed. For the reason that the plasma jet itself is unable to melt the seam, the exposed face of the seam which is just under and after the arc passed becomes in a dry condition. Consequently, there are produced abnormal beads, which are caused at high speed welding, as lack of fusion, under cut or humping bead.

As mentioned above, a high speed gas shielded arc weld of more than 5m/min is difficult to put into practice in the prior art. It has, however, discovered from the present inventors' experiments that incomplete short circuit transfer (IV in FIG. 1) exists in a high current methd corresponding to a change of weld voltage wherein a gas showing small potential gradient is added into the shield gas, whereby a phenomenon of short circuit is produced between the spray transfer technique (II in FIG. 1) and the short circuit transfer technique (III in FIG. 1) at the same time and the spray arc is kept in appearance. An oscillogram pattern showing the above incomplete short circuit transfer scope is shown in FIG. 4. A time of short circuit is 1/500 - 1/1000 sec. and the wave form of weld voltage shows a considerable value even at the short circuit time, which does not drop to near o volts, being different from that of FIG. 2. It is confirmed that all of the above-mentioned difficulties of the prior art are settled by the above high speed gas shielded arc weld in the technique of incomplete short circuit transfer.

This method of the present invention lies in that the welding voltagecurrent is set up in the scope of incomplete short circuit transfer (IV) when a gas shielded arc weld is performed at a high speed of more than at least 3m/min, especially more than 5m/min. In such a method, the condition of incomplete short circuit is as follows.

First, a far higher welding current for a diameter of used wire is supplied and a strong pinch force is generated at the tip of the electrode. Next, as seen in FIG. 5 by the above pinch force, the molten tip (2) of the electrode (1) is lengthened and moreover, is put into contact with the molten metal of the seam.

In order to weld in accordance with the specific transfer manner of the droplet shown in FIG. 5, the proper composition of used shielding gas should be prepared and a suitable weld voltage-current should be set up. The gas composition meeting these requirements is as follows: In the cause of producing the condition that the arc does not stop even at a time of short circuit which is one of the features of this invention, it is required that the gas used has a small potential gradient. In order to generate an incomplete short circuit, it is required that the tip of the electrode is lengthened like a pencil and the drop rate of the voltage made large. Such a condition may be obtained whereby the arc is produced also from the side of the electrode as well as its tip. In this case the molten tip is shut in the arc and the pinch force of the acts itself acts on the above molten portion. Thus, the producing of an arc from the side of electrode is a main cause of generating the incomplete short circuit. In view of this, it is desirable that the potential gradient of the gas be small. If the above potential gradient is large, the arc becomes contracted and, therefore, the arc is produced only from the tip of the electrode and the incomplete short circuit is generated because the tip is made globular. Accordingly, argon gas showing small potential gradient is recommended as a preferable main shielding gas. In an actual operation, only argon or argon with additives of an active gas such as $CO_2$ and/or $O_2$ is employed. However, the addition of these active gases should be limited in amount since the potential gradient of every active gas is large. That is, it is confirmed in many experiments that the amount of $CO_2$ added should be limited within the range of 80% or less, and $O_2$ 30% or less. From experiments, it has been found that no incomplete short circuit was generated when only $CO_2$ is employed.

Next, the actual level of the welding voltage-current should be set up upon the diameter of the electrode using the composition of the shielding gas and the welding speed. In either case, when high speed welding is put into practice, a preferable diameter of electrode is more than 3.0mm$\phi$; a welding current is more than 400A, and particularly more than 600A. If these requirements are kept, an oscillogram as shown in FIG. 4 may be easily obtained.

The bead producing mechanism of method of the present invention with the above mentioned requirements will now be explained in comparison with that of the prior art. When a gas composition and a welding voltage-current are set up so as to produce incomplete short circuit transfer, e.g. to meet the requirement of this invention, the tip of the electrode is lengthened and contacted with molten metal (4) of the seam. In such a case, the sectional area of the molten portion (2) at the lengthened tip becomes small, and consequently, its resistance increases. Accordingly, the drop rate of the weld voltage at the contact portion becomes large, but does not drop to near 0 volts. On the other hand, when this is observed on the producing practice of arc, it is as follows. In the case of weld work performed using short circuit transfer as in the prior art, the arc stops at the time of said short circuit. But, when it is performed at the point of incomplete short circuit transfer in accordance with the present invention, stopping of the arc does not occur since the welding voltage shows a considerable value even at the time of producing a short circuit. Therefore, even with high speed welding of more than 5m/min, the progress of the molten pool by the arc is performed with ease and stability. An unstable phenomenon of the transfer, which is produced when high speed welding is performed using short circuit transfer, does not entirely occur and sound beads are formed without any spatter. Furthermore, with incomplete short circuit transfer, the tip of the electrode contacts the molten metal or is near the molten metal. Accordingly, the accelerating scope of the plasma jet, i.e. arc column, which is unavoidable with the spray transfer technique, is possible to be eliminated. It is needless to say that the plasma jet is feeble as compared with that of the prior art. Thereby, the running away of the molten metal backward does not entirely occur, and consequently, it is possible to obtain sound weld bonds without any abnormal beads.

The main and other features of this invention will be apparent from the following examples.

EXAMPLE I

Welding requirements
Mother material: kind of steel, JIS SM50B thickness, 20mm
Welding current: 900A
Voltage of arc: 25V
Welding speed: 5m/min
Shielded gas: Ar (30L/min)+$CO_2$ (30L/min)
Consumable electrode: diameter, 3.2mm$\phi$
groove: depth, 6mm Angle, 70°

Figure 6B:
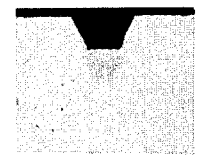

An actual weld is performed with the above requirements. It is confirmed that the wave form of the above voltage-current is as shown in the oscillogram of FIG. 4, that is, an incomplete short circuit transfer. The formed beads were uniform and sound as shown in FIGS. 6 (a) and 6 (b) and the shape of the section was very good.

Next, as compared with this invention, a method wherein welding requirements are set up so as to produce short circuit transfer (the above prior art I) and another method wherein the requirements are set up within the scope between a short circuit starting voltage and the voltage plus 2V under a current of more than 400A (prior art II) were carried out. The details of these welding methods are as follows.

Prior art I

Welding current: 500A
Arc voltage: 21V
Shielded gas: $CO_2$ (50L/min)
Diameter of electrode: 2.4mm$\phi$

Prior art II

Welding current: 800A
Arc voltage: 25V
Shielded gas: $CO_2$ (50L/min)
Diameter of electrode: 3.2mm$\phi$
Other requirements: i.e., mother material, welding speed and groove; Both prior art methods have the same requirements as those of the examples according to this invention.

Results:

Prior art I

Figure 7A:
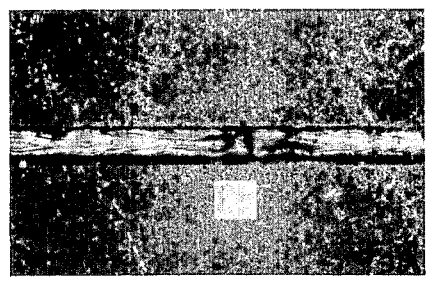
FIG. 7 (a) and FIG. 7 (b) are photographs of a plane and a section of a bead formed by the prior art method whereby the welding requirements are set up in short circuiting transfer scope, respectively.
Figure 7B:
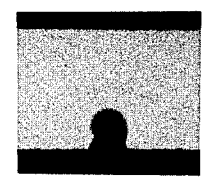
Figure 8A:
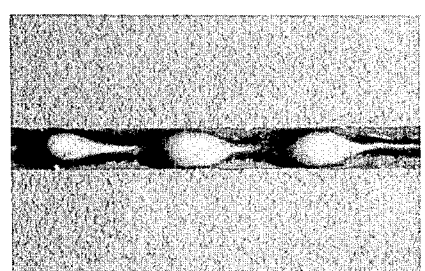
FIG. 8 (a) and FIG. 8 (b) are photographs showing a plane and a section of a bead formed by the prior art method whereby the welding requirements are set up in spray transfer scope, respectively.
Figure 8B:
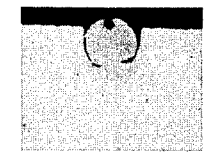

Some kind of spatter is formed on the surface of beads as shown in FIGS. 7 (a) and (b) and 7 discontinuous beads are formed, owing to which the producing droplet often became unstable.

Prior art II

Some kind of discontinuous beads, which are well known as a humping bead depending upon high speed, are formed. This is based on the following causes: first, this is a welding method using spray transfer. Accordingly, the molten metal is blown away backward by a dynamic pressure of a strong plasma jet. This is a fatal defect for a high speed weld.

EXAMPLE II

In this example, the welding requirements and the conditions of the weld bead, which are tack-welded by the method of this invention, the above mentioned prior art I and the prior art II respectively on the straight seam after an ordinary "UO press" operation, are investigated. The welding requirements and the results in this case are as shown in Table I. The following mother material was used.

kind of steel: APIx65
Thickness: 25.4mm
Groove angle: 50°
Groove depth: 9.5mm

Table I

| requirements and results | welding method prior art I | | | |
|---|---|---|---|---|
| Welding speed (m/min) | 6 | 7 | 8 | 9 |
| welding current (A) | 550 | 570 | 600 | 620 |
| arc voltage (V) | 21 | 21 | 22 | 22 |
| scope of droplet transfer (FIG. 1) | III | III | III | III |
| composition of shielding gas | $CO_2$ | $CO_2$ | $CO_2$ | $CO_2$ |
| diameter of electrode (mm$\phi$) | 2.4 | 2.4 | 2.4 | 2.4 |
| condition of tack welded beads | discontinuous | discontinuous | discontinuous | discontinuous |
| forming of spatter | present | present | present | present |
| lack of fusion | present | present | present | present |
| producing of humping bead | absent | absent | absent | absent |

Table I-continued

| | prior art II | | | | This invention method | | | |
|---|---|---|---|---|---|---|---|---|
| | 6 | 7 | 8 | 9 | 6 | 7 | 8 | 9 |
| | 800 | 800 | 850 | 850 | 950 | 950 | 950 | 1000 |
| | 25 | 25 | 26 | 26 | 25 | 26 | 27 | 27 |
| | II | II | II | II | IV | IV | IV | IV |
| | $CO_2$ | $CO_2$ | $CO_2$ | $CO_2$ | $Ar + CO_2$ | $Ar + CO_2$ | $Ar + CO_2$ | $Ar + CO_2$ |
| | 3.2 | 3.2 | 3.2 | 3.2 | 3.2 | 3.2 | 3.2 | 3.2 |
| | discontinuous | discontinuous | discontinuous | discontinuous | continous | continous | continous | continous |
| | absent | absent | absent | absent | absent | absent | absent | absent |
| | present | present | present | present | absent | absent | absent | absent |
| | remarkable | remarkable | remarkable | remarkable | absent | absent | absent | absent |

As clear in the above table, it will be understood that sound beads are impossible to be obtained by any of the prior art high speed welding methods. The method of the present invention, however, is able to produce the stable and sound beads and welded seam even with a high welding speed of 9m/min.

The above examples are from experiments for welding a straight seam. Moreover, it is confirmed that the method of this invention is also very effective and reliable in full as a tack welding method for a spiral seam, e.g. spiral tube and pipe and the like.

We claim:

1. In a gas shielded arc welding method for a long seam of formed pipe and the like, the improvement comprising:
   feeding a formed pipe, or the like, past a welding station at a high welding speed of at least 3m/min; and
   applying, via an electrode having a diameter of at least 3.0mm, a welding voltage and a welding current of at least 400 amperes to said passing formed pipe in the vicinity of the seam to be formed thereon at a combined welding voltage and current level to produce a welding arc and incomplete short circuit transfer so that a pinch force is caused at a tip of the electrode and the molten tip of the electrode is lengthened by the pinch force and is put into contact with the molten metal of the seam, and so that another arc is produced from the side of the electrode, and the molten electrode tip is enclosed in the arc and the pinch force of the arc acts on the molten portion, said combined welding voltage and current level being such that the arc produced by the welding voltage and current does not stop at a time of a short circuit.

2. The method of claim 1 wherein said formed pipe, or the like, is feed at a speed within the range of from about 5m/min to about 9m/min.

3. The method of claim 1 comprising shielding the arc with a shielding gas having a small potential gradient.

4. The method of claim 3 wherein said shielding gas consists essentially of argon.

5. The method of claim 3 wherein the shielding gas consists essentially of a mixture of argon and $CO_2$, the amount of $CO_2$ being 80% or less.

6. The method of claim 3 wherein the shielding gas consists essentially of a mixture of argon and oxygen, the amount of oxygen being 30% or less.

7. The method of claim 3 wherein said shielding gas consists essentially of a mixture of argon, oxygen and $CO_2$.

8. The method of claim 1 wherein said electrode is a consumable welding electrode and the arc is produced at the end of said consumable electrode which is adjacent said seam to be formed on said pipe.

9. The method of claim 8 comprising further producing arcing from the side of said consumable electrode at the same time said arc is produced at said end of said consumable electrode.

10. The method of claim 8 wherein said consumable electrode is connected to a power source and has a free end which is adjacent said seam to be formed on said pipe.

11. The method of claim 1 comprising producing a welding current of from about 400 amperes to about 1000 amperes to produce said incomplete short circuit transfer.

* * * * *